United States Patent
Zhang (10) Patent No.: US 10,325,144 B2
(45) Date of Patent: Jun. 18, 2019

(54) WEARABLE APPARATUS AND INFORMATION PROCESSING METHOD AND DEVICE THEREOF

(71) Applicant: BOE TECHNOLOGY GROUP CO., LTD., Beijing (CN)

(72) Inventor: Jingyu Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 7 days.

(21) Appl. No.: 15/326,114

(22) PCT Filed: Feb. 5, 2016

(86) PCT No.: PCT/CN2016/073629
§ 371 (c)(1),
(2) Date: Jan. 13, 2017

(87) PCT Pub. No.: WO2017/049843
PCT Pub. Date: Mar. 30, 2017

(65) Prior Publication Data
US 2017/0262696 A1    Sep. 14, 2017

(30) Foreign Application Priority Data

Sep. 22, 2015  (CN) .......................... 2015 1 0609800

(51) Int. Cl.
*G06F 1/16*     (2006.01)
*G06F 3/01*     (2006.01)
(Continued)

(52) U.S. Cl.
CPC ......... *G06K 9/00288* (2013.01); *G06F 1/163* (2013.01); *G06F 3/011* (2013.01);
(Continued)

(58) Field of Classification Search
CPC .. G06K 9/00288; G06K 9/00335; G06K 9/20; G06F 3/011
See application file for complete search history.

(56) References Cited

U.S. PATENT DOCUMENTS 7,301,648 B2 * 11/2007 Foxlin .................. G02B 27/017
                                                                356/620
2004/0208496 A1 * 10/2004 Pilu ........................ H04N 5/232
                                                                396/263
(Continued)

FOREIGN PATENT DOCUMENTS

CN          101286196 A          10/2008
CN          103064188 A           4/2013
(Continued)

OTHER PUBLICATIONS

Chinese Office Action dated Aug. 9, 2017.
Search Report and Written Opinion dated Jun. 27, 2016 from State Intellectual Property Office of the P.R. China.

*Primary Examiner* — Kim Y Vu
*Assistant Examiner* — Molly Delaney
(74) *Attorney, Agent, or Firm* — Dilworth & Barrese, LLP.; Michael J. Musella, Esq.

(57) ABSTRACT

A wearable apparatus, including: an image collector (11), configured to acquire facial images and body images of an interaction partner who is interacting with the user of the apparatus; a controller (12) connected with the image collector and configured to analyze the facial images and the body images to achieve analysis results; and an output device (13) connected with the controller and configured to output the analysis results. The wearable apparatus is portable and of low cost, and capable of determining the psychological situation of the current interaction partner according to the images information of the interaction partner based on simple operations. An information processing method and an information processing apparatus of the wearable apparatus are also provided.

17 Claims, 6 Drawing Sheets

(51) Int. Cl.
*G06F 3/03* (2006.01)
*G06F 3/16* (2006.01)
*G06K 9/00* (2006.01)
*G06K 9/20* (2006.01)

(52) U.S. Cl.
CPC .............. *G06F 3/0304* (2013.01); *G06F 3/16* (2013.01); *G06K 9/00302* (2013.01); *G06K 9/00335* (2013.01); *G06K 9/20* (2013.01)

(56) References Cited

U.S. PATENT DOCUMENTS

| | | |
|---|---|---|
| 2008/0253695 A1 | 10/2008 | Sano et al. |
| 2013/0137076 A1* | 5/2013 | Perez ........................ G09B 5/06 434/308 |
| 2013/0245396 A1* | 9/2013 | Berman .............. G06F 19/3418 600/301 |
| 2016/0170584 A1* | 6/2016 | Kumar .................... G06F 3/013 715/811 |
| 2016/0191995 A1* | 6/2016 | el Kaliouby ........... A61B 5/165 725/12 |
| 2016/0275817 A1* | 9/2016 | Chen .................... G09B 21/006 |
| 2017/0095192 A1* | 4/2017 | Sadowsky .............. A61B 5/165 |

FOREIGN PATENT DOCUMENTS

| | | |
|---|---|---|
| CN | 103941574 A | 7/2014 |
| CN | 104820495 A | 8/2015 |
| CN | 105183170 A | 12/2015 |

* cited by examiner

WEARABLE APPARATUS AND INFORMATION PROCESSING METHOD AND DEVICE THEREOF

TECHNICAL FIELD

The present disclosure relates to a wearable apparatus as well as an information processing method and an information processing device for a wearable apparatus.

BACKGROUND

With the development of internet technologies, a growing number of intelligent wearable apparatuses have come into our life. Intelligent wearable apparatuses can bring great convenience to their users' lives. For example, intelligent glasses can be used by their users to take pictures of scenes sawn by them and share the pictures through networks.

Nowadays, communications between two parties in society are often mixed with a lot of falsehood/lies and a lie detector can be used to determine whether what someone has said is true. For example, while the contacts of a lie detector are coupled to the body of the subject to be detected, the subject is asked questions and then the variation of his brain wave or heart rate is observed to determine comprehensively his index of lie.

However, the test using the above-mentioned lie detector has to be repeated; besides the lie detector must be coupled to the body of the subject, and is complex to operate, of high costs and inconvenient to carry. Therefore, how the inner truth of a communicate (e.g. the truthfulness of what he has said) can be monitored using a simple and portable intelligent wearable apparatus has become a problem to be solved urgently.

SUMMARY

According to one aspect of this disclosure, a wearable apparatus is provided, comprising: an image collector configured to acquire facial images and body images of an interaction partner who is interacting with the user of the apparatus; a controller connected with the image collector and configured to analyze the facial images and the body images to achieve analysis results; and an output device connected with the controller and configured to output the analysis results.

For example, wherein the image collector is a first camera to acquire facial images and body images of the interaction partner; or the image collector comprises a second camera to acquire body images of the interaction partner and a receiver to receive facial images of the interaction partner.

For example, wherein the first camera and/or the second camera are/is binocular camera(s).

For example, wherein the output device is a display screen for display of analysis results; or the output device is a voice displayer for playback of analysis results in voice.

For example, wherein the wearable apparatus is intelligent glasses.

For example, wherein the intelligent glasses further comprise a glasses body and the image collector, controller and output device are all disposed on the glasses body.

For example, wherein the analysis results comprise an analysis result of behavior obtained through analyzing the body images as well as an analysis result of heart rate and an analysis result of pupil obtained by analyzing the facial images.

For example, wherein the wearable apparatus further comprises a selecting device, which is connected with the controller and configured to receive a selecting instruction from the user and send it to the controller so that the controller may obtain analysis results corresponding to the selecting instruction.

For example, wherein the selecting device comprises a first selecting unit to receive an analysis instruction for interest from the user and a second selecting unit to receive an analysis instruction for credibility from the user.

For example, wherein the wearable apparatus further comprises: a wireless module connected with the controller and operable to communicate with network equipments through a wireless network; and/or a GPS module connected with the controller and operable to locate the wearable apparatus; and/or an image collector connected with the controller and operable to acquire facial images of the user of the wearable apparatus and a transmitter connected with the controller and operable to transmit the images acquired by the image collector.

For example, wherein the wearable apparatus comprises a head-mounted wearable apparatus.

For example, wherein the interaction partner comprises a conversation partner.

According to one aspect of this disclosure, An information processing method for a wearable apparatus is provided, comprising: acquiring image information of the interaction partner who is interacting with the user of the wearable apparatus, the information comprising facial images and body images of the interaction partner; analyzing the body images to achieve an analysis result of behavior and analyzing the facial images to achieve an analysis result of heart rate and an analysis result of pupil; determining an output result of the conversation contents given by the interaction partner in accordance with the analysis result of behavior, analysis result of heart rate and analysis result of pupil; and outputting the output result of the conversation contents to the user of the wearable apparatus.

For example, before the body images are analyzed, the method further comprises the step of receiving a selecting instruction; if the received selecting instruction is an analysis instruction for interest, the analysis results of behavior, heart rate and pupil are respectively analysis results of behavior, heart rate and pupil indicating whether there is interest in the interaction contents; and if the received selecting instruction is an analysis instruction for credibility, the analysis results of behavior, heart rate and pupil are respectively analysis results of behavior, heart rate and pupil indicating the credibility rate of the interaction contents.

For example, wherein the step of analyzing the body images to achieve an analysis result of behavior comprises: comparing the body image at the current point in time with the body image at the first point in time; and determining an analysis result of behavior indicating that the conversation partner is interested in the current interaction contents if the body image at the current point in time is nearer to the user relative to the body image at the first point in time; wherein the first point in time is prior to the current point in time, and there is a preset interval between the two points.

For example, wherein the step of analyzing the facial images to achieve analysis results of heart rate and pupil comprises: analyzing the facial images using contactless pulse oximetry to achieve the analysis result of heart rate; obtaining the pupil area in the facial image at the current point in time and the pupil area in the facial image at the second point in time; and comparing the pupil area at the current point in time with the pupil area at the second point in time to achieve the analysis result of pupil; wherein the second point in time is prior to the current point in time, and there is a preset interval between the two points.

For example, wherein the step of determining an output result of the interaction contents given by the interaction partner in accordance with the analysis result of behavior, analysis result of heart rate and analysis result of pupil comprises: determining the output result of the interaction contents of the interaction partner to be positive when at least two of the analysis result of behavior, analysis result of heart rate and analysis result of pupil are positive; or in accordance with predetermined weighting factors of individual analysis results, obtaining the output result of the interaction contents of the interaction partner by multiplying the analysis results with their own weighting factors and adding the products together; or obtaining the average value of all the analysis results and taking it as the output result of the interaction contents of the interaction partner.

For example, wherein the wearable apparatus comprises a head-mounted wearable apparatus.

For example, wherein the interaction partner comprises a conversation partner.

According to one aspect of this disclosure, an information processing device for a wearable apparatus is provided, the device comprising: an acquiring unit configured to acquire image information of the interaction partner who is interacting with the user of the wearable apparatus, the information comprising facial images and body images of the interaction partner; a processing unit configured to analyze the body images to achieve an analysis result of behavior and analyze the facial images to achieve analysis results of heart rate and pupil; an analyzing unit configured to determine an output result of the interaction contents given by the interaction partner in accordance with the analysis result of behavior, analysis result of heart rate and analysis result of pupil; and an output unit configured to output the output result of the interaction contents to the user of the wearable apparatus.

For example, wherein the device further comprises: a receiving unit operable to receive an selecting instruction from the user before the body images and the facial images are analyzed by the processing unit; wherein if the received selecting instruction is an analysis instruction for interest, the analysis results of behavior, heart rate and pupil from the processing unit are respectively analysis results of behavior, heart rate and pupil indicating whether there is interest in the interaction contents; and if the received selecting instruction is an analysis instruction for credibility, the analysis results of behavior, heart rate and pupil from the processing unit are respectively analysis results of behavior, heart rate and pupil indicating credibility rate of the interaction contents.

For example, wherein the processing unit is further configured to compare the body image at the current point in time with the body image at the first point in time; and determine an analysis result of behavior indicating that the conversation partner is interested in the current interaction contents if the body image at the current point in time is nearer to the user relative to the body image at the first point in time; wherein the first point in time is prior to the current point in time, and there is a preset interval between the two points.

For example, wherein the processing unit is further configured to analyze the facial images using contactless pulse oximetry to achieve an analysis result of heart rate; obtain the pupil area in the facial image at the current point in time and the pupil area in the facial image at a second point in time; and compare the pupil area at the current point in time with the pupil area at the second point in time to achieve an analysis result of pupil; wherein the second point in time is prior to the current point in time, and there is a preset interval between the two points.

For example, wherein the analyzing unit is further configured to determine the output result of the interaction contents of the interaction partner to be positive when at least two of the analysis results of behavior, heart rate and pupil are positive; or in accordance with predetermined weighting factors of individual analysis results, obtain an output result of the interaction contents of the interaction partner by multiplying the analysis results with their own weighting factors and adding the products together; or obtain the average value of all the analysis results and taking it as the output result of the interaction contents of the interaction partner.

For example, wherein the wearable apparatus comprises a head-mounted wearable apparatus.

For example, wherein the interaction partner comprises a conversation partner.

DETAILED DESCRIPTION

The technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1A:
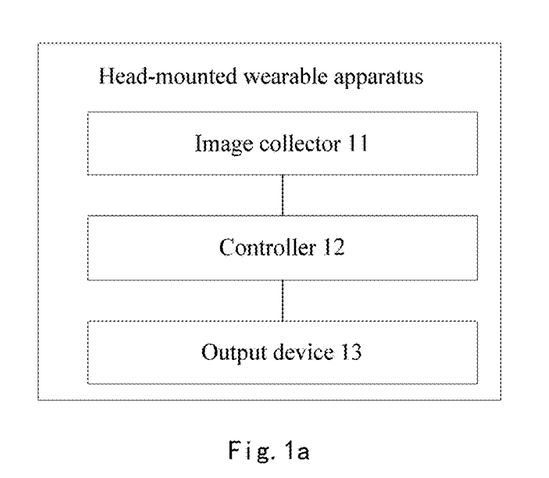
FIGS. 1a-1b are structure diagrams of a head-mounted wearable apparatus provided in an embodiment of the present disclosure.
Figure 1B:
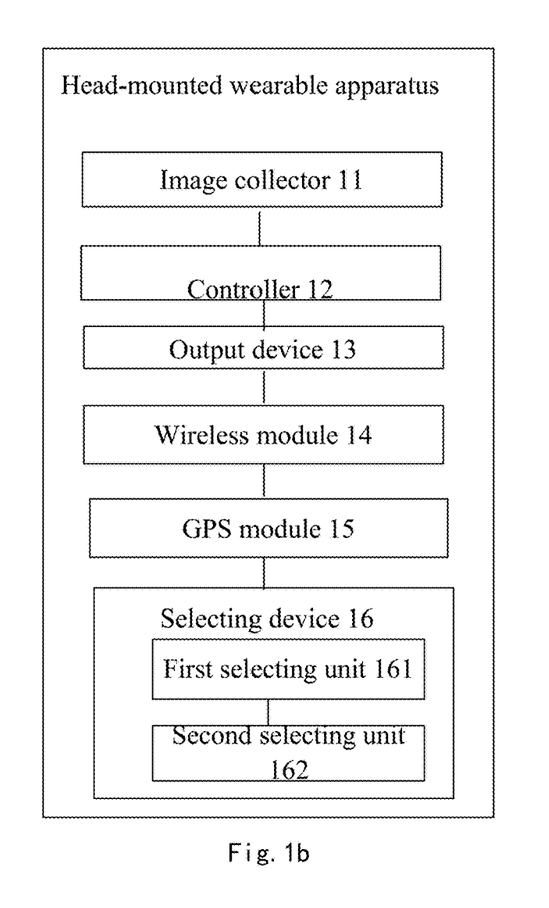

FIGS. 1a-1b show structural diagrams of a head-mounted wearable apparatus provided in an embodiment of the present disclosure. As shown in FIG. 1a, the head-mounted wearable apparatus in the present embodiment includes an image collector 11, a controller 12 connected with the image collector 11 and an output device 13 connected with the controller 12. For example, the image collector 11 may be a camera, the controller 12 may be a central processing unit, a microprocessor chip, etc., and the output device 13 may be a display, a speaker, etc. Of course, those of ordinary skills in the art should understand that the head-mounted wearable apparatus is only an example of the present disclosure, and other wearable apparatuses such as intelligent watches, intelligent clothes, intelligent accessories, etc. may also be used in embodiments of the present disclosure.

Wherein the above-mentioned image collector 11 is operable to acquire images of the face and body of the conversation partner who is interacting with the user of the head-mounted wearable apparatus. The controller 12 is operable to analyze the images of the face and body of the conversation partner and get analysis results. The output device 13 is operable to output the analysis results. It should be noted that the interaction with the user of the head-mounted wearable apparatus includes a variety of other ways of interactions or combinations thereof in addition to conversation. For example, interaction may proceed through body language such as gestures, through facial expression, etc. When the user of the head-mounted wearable apparatus is interacting with his conversation partner through conversation, the above-mentioned analysis results include analysis results of content and manner of their conversation. When the interaction between the user of the head-mounted wearable apparatus and his conversation partner takes another way, the above-mentioned analysis results accordingly include analysis results of content and manner of the interaction. The present embodiment of the disclosure is described only in the case of the conversation partner who interacts with the user of the head-mounted wearable apparatus.

The image collector 11 in the present embodiment may be a first camera to acquire images of the face and body of the conversation partner. For example, the first camera may be a binocular one, which has a high resolution and can acquire two images of the conversation partner from different directions/locations so as to capture minor changes in facial images of the conversation partner for subsequent analysis by the controller.

Of course, in other embodiments, the above-mentioned image collector 11 may include two or more cameras with angles formed therebetween horizontally. It is to be noted that two of them may be spaced apart by a preset distance, can both capture high-resolution images, and can capture two images of the conversation partner simultaneously from two different angles/directions/locations, so that minor changes in facial images of the conversation partner can be captured for subsequent analysis by the controller to achieve accurate results.

The above-mentioned output device 13 may be a display for display of analysis results, such as a liquid crystal display. Alternatively, in other embodiments, the output device 13 may be a voice displayer, such as a microphone, to play back analysis results in voice.

The head-mounted wearable apparatus in the present embodiment can acquire images of the conversation partner by means of a head-mounted image collector, analyze the images through the controller to determine the truthfulness/interest of the conversation partner with regard to the current conversation, and output the results through the output device 13. Furthermore, the head-mounted wearable apparatus of the present disclosure is convenient to carry and of low costs, and can be used more widely and improve user experiences.

For example, with reference to FIG. 1b, the head-mounted wearable apparatus further includes a wireless module 14 and/or a Global Positioning System (GPS) module 15. The wireless module 14 and the GPS module 15 are both connected with the controller 12. The wireless module 14 is used to enable the controller to communicate with other network equipments (e.g. intelligent terminals, etc.), and it may be, for example, a communication module including a wireless router, an antenna, etc. The controller may send analysis results through the wireless module 14 to an intelligent terminal for display or other purposes.

The GPS module 15 may be used to locate the head-mounted wearable apparatus and provide location information and the like.

By way of example, the above-mentioned head-mounted wearable apparatus may be intelligent glasses that include a glasses body, and the image collector 11, the controller 12 and the output device 13 in the above FIG. 1a can all be mounted on the glasses body.

Furthermore, in practical applications, with reference to FIG. 1b, the head-mounted wearable apparatus shown in FIG. 1 and described above may include a selecting device 16 that is connected with the controller 12 and used to receive a selecting instruction from the user and send it to the controller 13 which then get analysis results corresponding to the selecting instruction. The selecting device 16 may be keys receiving user input, a microphone receiving voice commands from the user or the like.

Furthermore, the selecting device 16 includes a first selecting unit 161 to receive an analysis instruction for interest from the user and a second selecting unit 162 to receive an analysis instruction for credibility from the user.

By way of example, the selecting device 16 described above may be selection buttons, such as buttons disposed on the glasses body of the intelligent glasses and connected with the controller for the user to select an analysis aspect. When a button is activated, the controller 12 will obtain analysis results in the aspect belonging to the activated button.

Alternatively, buttons operable to enable or disable the intelligent mode are disposed on the glasses body of the intelligent glasses, and if the button operable to enable the intelligent mode is selected by the user, the controller 12 will obtain analysis results in a default analysis aspect. Generally, the default analysis aspect is about interest in the conversation.

For example, when A is conversing with B, the intelligent glasses described above may be worn by A to acquire and analyze images of the face and body of B in real time and output analysis results to A, so that A can determine whether B is interested in the current conversation or determine the credibility of what B has said.

It is to be noted that when the selecting device 16 receives a selecting instruction, the controller 12 as shown in FIG. 1b may obtain corresponding analysis results in accordance with the selecting instruction. For example, the body image at the current point in time is compared with that at a first point in time, and if the former is nearer to the user relative to the latter, it can be determined that the conversation partner is interested in the contents of the current conversation, resulting in an analysis result of behavior.

Wherein the first point in time is prior to the current point in time, and there is a preset interval between the two points.

The controller 12 can also analyze facial images, and obtain analysis results of heart rate and pupil. For example, the controller analyzes facial images with contactless pulse oximetry to obtain an analysis result of heart rate; the controller obtains the pupil area in the facial image at the current point in time and that in the facial image at the second point in time, and makes comparison between them to get an analysis result of pupil.

Wherein the second point in time is prior to the current point in time, and there is a preset interval between the two points.

Furthermore, the controller 12 in the present embodiment may also include an analyzing module, which is operable to determine an output result of the conversation contents given by the conversation partner in accordance with the analysis results of behavior, heart rate and pupil.

For example, the analyzing module may determine the output result of the conversation contents given by the conversation partner to be positive when at least two of the analysis results of behavior, heart rate and pupil are positive.

Alternatively, in accordance with predetermined weighting factors of individual analysis results, the analyzing module may determine the output result of the conversation contents given by the conversation partner by multiplying the analysis results with their own weighting factors and adding the products together.

Alternatively, the analyzing module may obtain the average value of all the analysis results and take it as the output result of the conversation contents of the conversation partner. It is to be noted that the positive result, as used herein, may be understood as the result desired by the user. As such, misjudgments are avoided effectively during analysis of the various analysis results. The output result of the conversation contents of the conversation partner is determined to be positive when at least two of the analysis results of behavior, heart rate and pupil are positive. In an example to illustrate this, stable heart rate is analyzed to mean no lying during heart rate analyzing (a positive result); dilated pupils are analyzed to mean lying during pupil analyzing (a negative result); and it is analyzed to mean no lying that the conversation partner is near to the user during behavior analyzing (a positive result). As a result, misjudgments can be avoided, which otherwise may be caused by analyzing only facial images or body images. Alternatively, misjudgments can be eliminated according to difference between the weighting factors of individual analysis results, which follows a principle similar to that described above, and no further details will be described herein.

The intelligent glasses in the present embodiment may have other functionality, such as taking photographs, navigation, etc. The intelligent glasses in the present embodiment may be intelligent social glasses, whose hardware includes a glasses frame (i.e. a glasses body) as well as a binocular camera, a controller/processor, a wireless module, a GPS module, a power module, and the like mounted on the glasses frame.

It can be seen from the above technical solution that in the head-mounted wearable apparatus and the information processing method and device thereof in the present disclosure the head-mounted image collector acquires images of the conversation partner, and the controller analyzes the images to determine truthfulness/interest of the conversation partner with respect to the current conversation and provides an output result through the output device. Moreover, the head-mounted wearable apparatus in the present disclosure is convenient to carry and of low costs. Furthermore, only by means of acquiring images of the conversation partner, the head-mounted wearable apparatus can determine his variation of heart rate, eyeball movement and change of pupil so as to get credibility of what he has said or his degree of interest in the conversation, so that the apparatus is convenient to operate, can be applied widely, and improves user experiences.

A second embodiment of the present disclosure will be presented in the following description, which is similar to the first embodiment, but is still different from it in that the image collector shown in FIG. 1 may include a second camera to acquire body images of the conversation partner and a receiver to receive facial images of the conversation partner. For example, the conversation partner may also wear a head-mounted wearable apparatus, through which the user's own facial images can be acquired and sent to other user equipments. In this way, the receiver may receive the facial images sent by the conversation partner.

Figure 2:
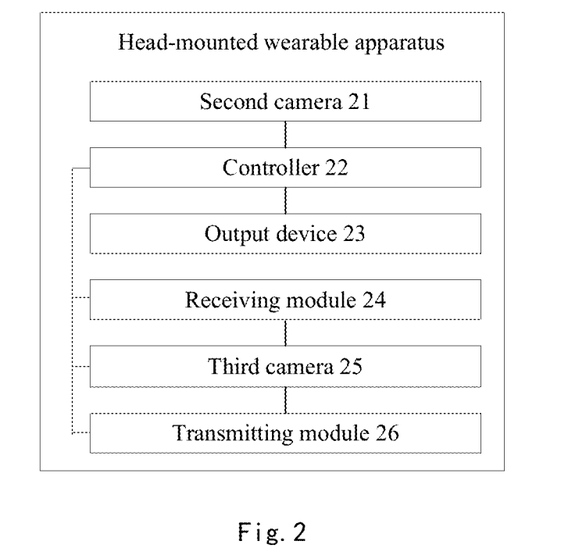
FIG. 2 is a structure diagram of a head-mounted wearable apparatus provided in another embodiment of the present disclosure.

FIG. 2 shows a structure diagram of a head-mounted wearable apparatus provided in another embodiment of the present disclosure. As shown in FIG. 2, the head-mounted wearable apparatus includes a second camera 21, a controller 22 (e.g. a CPU or a microprocessor) connected with the second camera 21, an output device 23 (e.g. a display or a speaker) connected with the controller 22 and a receiving module 24 (e.g. a receiving antenna or a memory) connected with the controller 22.

The second camera 21 may acquire body images of the conversation partner interacting with the user of the head-mounted wearable apparatus and the receiving module 24 may receive facial images of the conversation partner, such as those sent by the head-mounted wearable apparatus worn by the conversation partner. The controller 22 is operable to analyze the facial images and body images of the conversation partner and get analysis results, and the output device is operable to output the analysis results. It is to be noted that the head-mounted wearable apparatus is only an example of the present disclosure, and other wearable apparatuses such as smart watches, intelligent clothes, intelligent accessories, or the like may be used in embodiments of the present disclosure. Moreover, the interaction with the user of the head-mounted wearable apparatus may include a variety of other ways of interactions or combinations thereof in addition to conversation. For example, the interaction may proceed through body language such as gestures or through facial expression. When the user of the head-mounted wearable apparatus is interacting with a conversation partner through conversation, the above-mentioned analysis results include analysis results of conversation content and conversation manner. When the user of the head-mounted wearable apparatus is interacting with his conversation partner in other ways, the above-mentioned analysis results accordingly include analysis results of the contents and manner of the other ways of interactions. The present embodiment of the disclosure is described only in the case of the conversation partner who interacts with the user of the head-mounted wearable apparatus.

It is to be noted that what the receiving module 24 can receive in the present embodiment is facial images of the conversation partner sent by the head-mounted wearable apparatus worn by him. In other embodiments, the receiving module 24 may also receive facial images of the conversation partner from any intelligent apparatus as long as the intelligent apparatus can acquire and send facial images of the conversation partner in real time.

Furthermore, the second camera in the present embodiment is preferably a binocular camera, which has a relatively high resolution and can acquire two body images of the conversation partner from different directions/locations for subsequent analysis by the controller.

Optionally, the head-mounted wearable apparatus of the present embodiment may further include an image collector such as the third camera 25 shown in FIG. 2 and a transmitting module 26 (e.g. a transmitter), both of which are connected with the controller.

The image collector, i.e. the corresponding third camera 25, may be used to acquire facial images of the user of the head-mounted wearable apparatus and the transmitting module 26 may transmit the facial images of the user to the head-mounted wearable apparatus worn by the conversation partner.

That is to say, when two parties are conversing, they may each use their own head-mounted wearable apparatuses as shown in FIG. 2 to determine the value of interest (e.g. an interest index) of the other party in the current conversation contents, the credibility of what the other party has said, or other information.

For example, when A and B are conversing and both wear head-mounted wearable apparatuses as shown FIG. 2, the head-mounted wearable apparatus a worn by A acquires body images of B and facial images of A, and the head-mounted wearable apparatus b worn by B acquires facial images of B and body images of A; then the head-mounted wearable apparatus a worn by A receives the facial images of B sent by the head-mounted wearable apparatus b worn by B and analyzes the facial images and body images of B so as to get a result indicating whether B is interested in the current conversation or get the credibility of what B has just said or other information.

Figure 5:
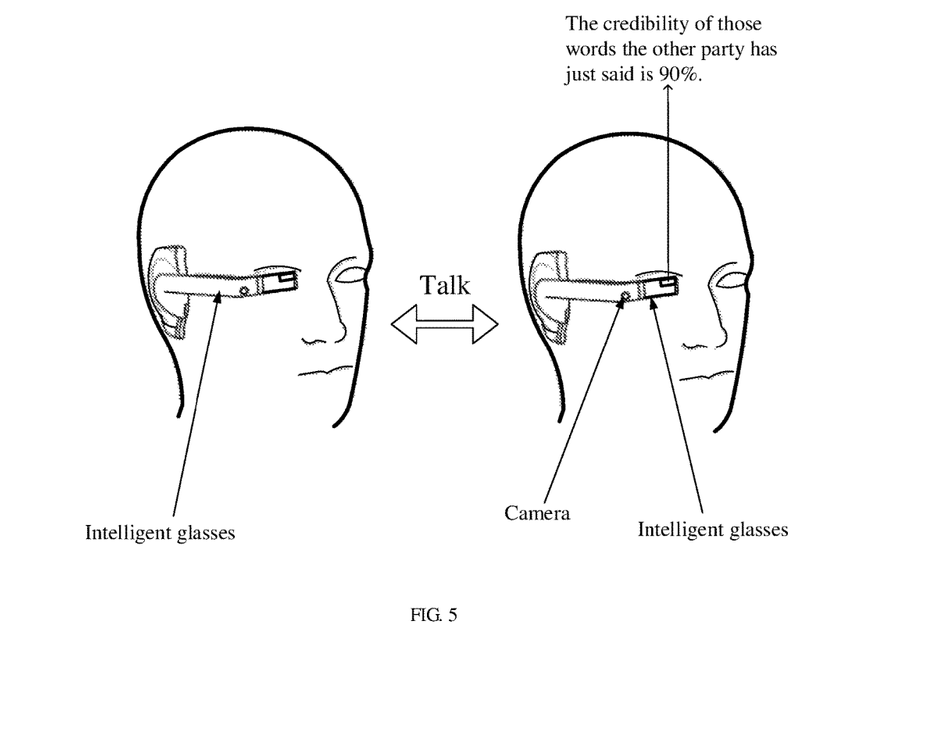
FIG. 5 are pictures of a scene for a head-mounted wearable apparatus provided in an embodiment of present disclosure.

In practical applications, the head-mounted wearable apparatus as shown in FIG. 2 may be intelligent glasses. As shown in FIG. 5, when conversing, both of the two parties of the interaction wear intelligent glasses respectively to learn about the interest of the other party in the current conversation contents and the credibility of what the other party has said. The intelligent glasses further include a glasses body, and the above-mentioned second camera 21, image collector, controller 22, output device 23, sending module 26 and receiving module 24 are all located on the glasses body.

Of course, the head-mounted wearable apparatus shown in FIG. 2 may further include a selecting device connected with the controller 22, which is the same as the one in FIG. 1b and used to receive selecting instructions from the user for the controller to get analysis results corresponding to the selecting instructions.

By way of example, the above-mentioned selecting device may be selection buttons connected with the controller 22, such as the buttons disposed on the glasses body for the user to select an analysis aspect.

Wherein when a button is activated by the user, the controller will get analysis results in the analysis aspect belonging to the activated button.

Of course, buttons operable to enable or disable the intelligent mode may further be disposed on the glasses body, and if the user selects to activate the button operable to enable the intelligent mode, the controller will get analysis results in the default analysis aspect.

The intelligent glasses in the present embodiment can perform qualitative analysis on the conversation contents of the conversation partner, and the intelligent glasses have compact configuration, are convenient to carry and of low costs, can be applied widely, and have user experiences improved.

Figure 3:
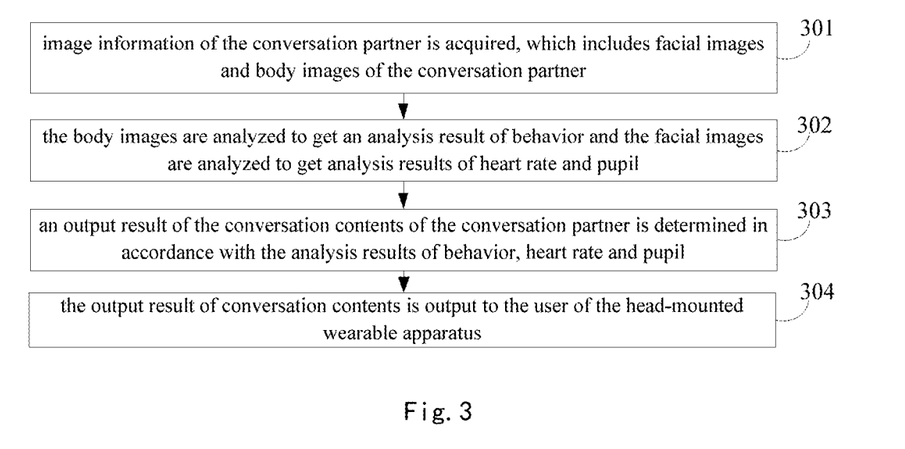
FIG. 3 is a flowchart of an information processing method for a head-mounted wearable apparatus provided in an embodiment of the present disclosure.

FIG. 3 shows a flowchart of an information processing method for a head-mounted wearable apparatus in one embodiment of the present disclosure. As shown in FIG. 3, the head-mounted wearable apparatus in the present embodiment operates as follows.

In step 301, image information of the conversation partner is acquired, which includes facial images and body images of the conversation partner.

For example, if the head-mounted wearable apparatus shown in FIG. 1 is used by a user, in step 301 image information of the conversation partner will be acquired in real time with the image collector such as a binocular camera.

If the head-mounted wearable apparatus shown in FIG. 2 is used by a user, in step 301 body images of the conversation partner will be acquired in real time with the first image collector, and facial images of the conversation partner, such as those sent by the head-mounted wearable apparatus worn by the conversation partner will be received by the receiving module.

In step 302, the body images are analyzed to get an analysis result of behavior and the facial images are analyzed to get analysis results of heart rate and pupil.

When the method shown in FIG. 3 uses the head-mounted wearable apparatus shown in FIG. 1 or FIG. 2, step 302 and the following step 303 may be performed through the controller of the head-mounted wearable apparatus. By way of example, the controller may get an analysis result of heart rate through contactless pulse oximetry.

In the present embodiment, the analysis aspect of interest is selected by the user and thus the analysis results of behavior, heart rate and pupil are respectively analysis results of behavior, heart rate and pupil indicating whether there is interest in the conversation contents.

If the analysis aspect of credibility is selected, the analysis results of behavior, heart rate and pupil will respectively be analysis results of behavior, heart rate and pupil indicating credibility rate of the conversation contents.

In step 303, an output result of the conversation contents of the conversation partner is determined in accordance with the analysis results of behavior, heart rate and pupil.

In step 304, the output result of conversation contents is output to the user of the head-mounted wearable apparatus.

When the method shown in FIG. 3 uses the head-mounted wearable apparatus shown in FIG. 1 or FIG. 2, step 304 may be performed by the output device of the head-mounted wearable apparatus.

Generally, when a person is lying, significant changes will occur in his gestures, use of words or other aspects, and therefore the eyeball area and the pupil area in the facial images may be analyzed in the above-mentioned embodiment to get an analysis result.

The head-mounted wearable apparatus in the present embodiment may be the above-mentioned intelligent glasses, which can determine analysis results of variation of heart rate, eyeball movement and change of pupil by acquiring image information of the conversation partner so as to get the credibility of what the conversation partner has said or the degree of interest of the conversation partner in the conversation.

Figure 4:
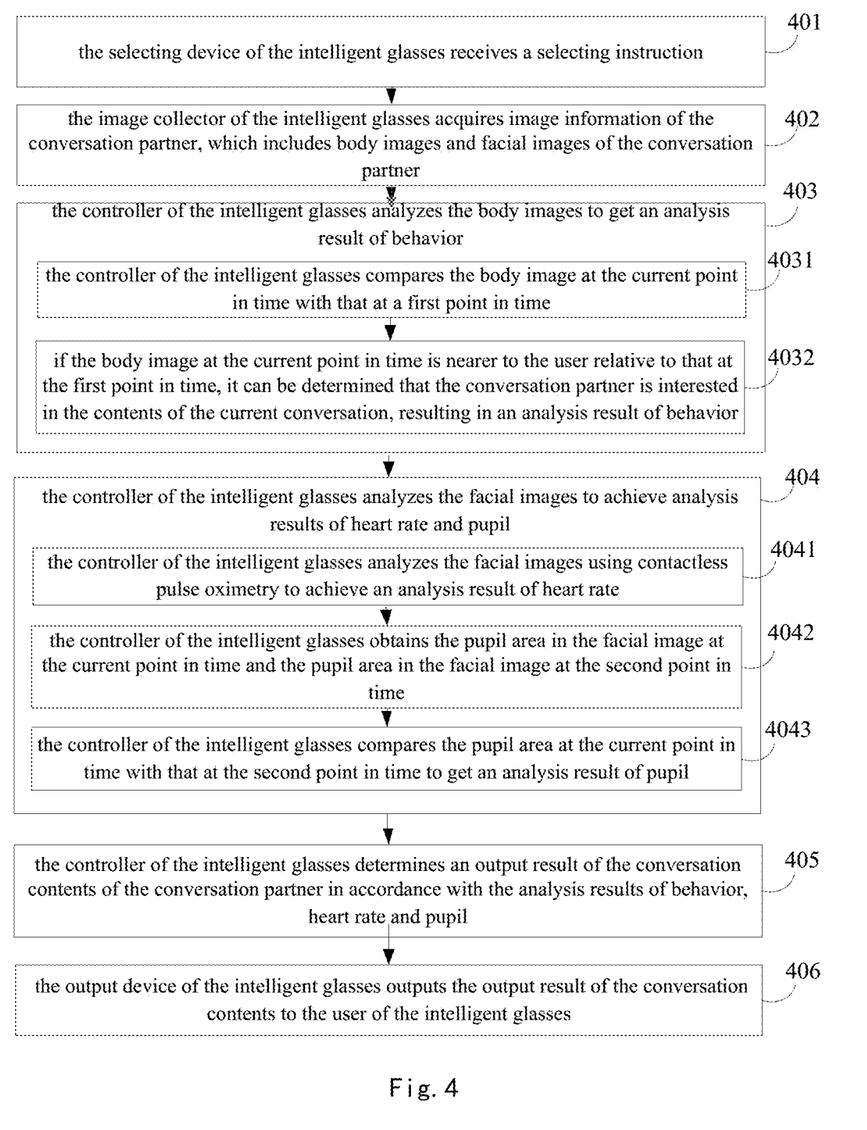
FIG. 4 is a flowchart of an information processing method for a head-mounted wearable apparatus provided in another embodiment of the present disclosure.

FIG. 4 shows a flowchart of an information processing method for intelligent glasses in one embodiment of the present disclosure. The information processing method for intelligent glasses in the present embodiment is as follows. It should be noted that the intelligent glasses in the present embodiment may be the head-mounted wearable apparatus shown in FIG. 1 or FIG. 2.

In step 401, the selecting device of the intelligent glasses receives a selecting instruction.

Of course, in practical applications, the selecting instruction may be an analyzing instruction for interest or credibility. Furthermore, in other embodiments, the selecting device may be a receiving unit, the module/unit receiving selecting instructions is not limited in terms of name, as long as it has the functionality of receiving selecting instructions.

In step 402, the image collector of the intelligent glasses acquires image information of the conversation partner, which includes body images and facial images of the conversation partner.

That is to say, when the intelligent glasses are worn by a user and a button for social function is activated (a button as illustrated above), more than two cameras will take facial images and body images of the conversation partner automatically.

In step 403, the controller of the intelligent glasses analyzes the body images to get an analysis result of behavior.

By way of example, step 403 may include the following sub-steps.

In sub-step 4031, the controller of the intelligent glasses compares the body image at the current point in time with that at a first point in time.

In sub-step 4032, if the body image at the current point in time is nearer to the user relative to that at the first point in time, it can be determined that the conversation partner is interested in the contents of the current conversation, resulting in an analysis result of behavior.

Wherein the first point in time is prior to the current point in time, and there is a preset interval between the two points.

In step 404, the controller of the intelligent glasses analyzes the facial images to achieve analysis results of heart rate and pupil.

By way of example, step 404 may include the following sub-steps.

In sub-step 4041, the controller of the intelligent glasses analyzes the facial images using contactless pulse oximetry to achieve an analysis result of heart rate.

That is to say, variation value of heart rate and in turn variation curve of heart rate of the conversation partner are achieved through contactless pulse oximetry. For example, if it is above a set threshold, the credibility of what the conversation partner has said is low. Generally, when a common person is lying, his heart rate will vary significantly.

In sub-step 4042, the controller of the intelligent glasses obtains the pupil area in the facial image at the current point in time and the pupil area in the facial image at the second point in time.

In sub-step 4043, the controller of the intelligent glasses compares the pupil area at the current point in time with that at the second point in time to get an analysis result of pupil.

Wherein the second point in time is prior to the current point in time, and there is a preset interval between the two points.

Generally, most people have their eyeballs move toward upper right when they are lying, and move toward upper left when they are trying to remember something that really happened. Therefore, it can be determined whether the conversation partner is lying in accordance with the direction of eyeball movement in the pupil area of his facial images.

In addition, when a person is caught in a repulsive, irritating or provoking topic, his pupil will contract involuntarily. On the contrary, when a person is involved in a pleasant topic, his pupil will dilate involuntarily, and if a person feels panic, cheerful, fond of something or excited, his pupil may dilate 4 or more times.

In step 405, the controller of the intelligent glasses determines an output result of the conversation contents of the conversation partner in accordance with the analysis results of behavior, heart rate and pupil.

By way of example, if at least two of the analysis results of behavior, heart rate and pupil are positive, the controller of the intelligent glasses may determine the output result of the conversation contents of the conversation partner to be positive. The positive result, as used herein, may be understood as the result desired by the user.

That is to say, if the selecting instruction is one for interest, and the analysis result of heart rate indicates interest, the analysis result of pupil indicates interest and the analysis result of behavior indicates no interest, the output result will be one indicating interest.

Alternatively, if the selecting instruction is an analysis instruction for credibility, and the analysis result of behavior indicates low credibility, the analysis result of heart rate indicates low credibility and the analysis result of pupil indicates high credibility, the output result will be one indicating low credibility.

In another possible implementation, in accordance with predetermined weighting factors of individual analysis results, the controller of the intelligent glasses may multiply the analysis results with their own weighting factors and add the products together to get the output result of the conversation contents given by the conversation partner.

In a third possible implementation, the controller of the intelligent glasses may calculate the average value of all the analysis results and take it as the output result of the conversation contents of the conversation partner.

In step 406, the output device of the intelligent glasses outputs the output result of the conversation contents to the user of the intelligent glasses.

By acquiring image information of the conversation partner, the intelligent glasses in the present embodiment may also determine variation of heart rate, eyeball movement and change of pupil of the conversation partner and in turn the credibility of what the conversation partner has said and the degree of interest of the conversation partner in the conversation. The intelligent glasses in the present embodiment of the disclosure are convenient to operate, of low costs, and make user experiences well improved.

To better illustrate embodiments of the present disclosure, the method of analyzing the facial images through contactless pulse oximetry by the controller of the intelligent glasses to get an analysis result of heart rate in sub-step 4041 will be described in details as follows.

Figure 6:
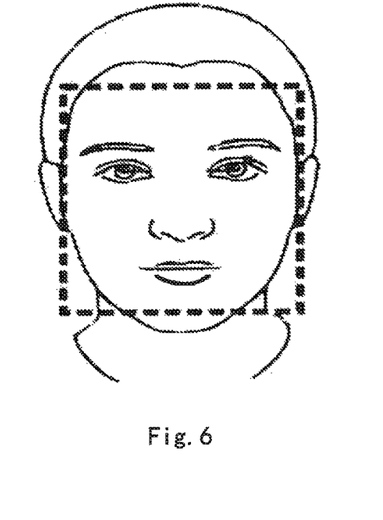
FIG. 6 is a schematic diagram of an analysis area in a facial image provided in an embodiment of present disclosure.

At present, contactless pulse oximetry of SpO2 photographic technology may detect human heart rate using a common optical camera, wherein, for example, a video including facial images of a person is taken and the same analysis area (e.g. the area in the dashed line box) is determined from each image of the video.

An average value of the pixels in G (green) and B (Blue) channels is extracted for the analyzed area in each image of the video, wherein the G channel is a green channel, and the B channel is a blue channel.

And the variation curve of heart rate of the person can be achieved according to the variation curve over time of the average value of the pixels in G channels and the variation curve over time of the average value of the pixels in B channels in the analysis areas of all the images of the video.

The head-mounted wearable apparatus in the present embodiment can find application in a variety of scenes such as a lie detecting scene, a blind date scene, a question and answer scene, etc.

Figure 7:
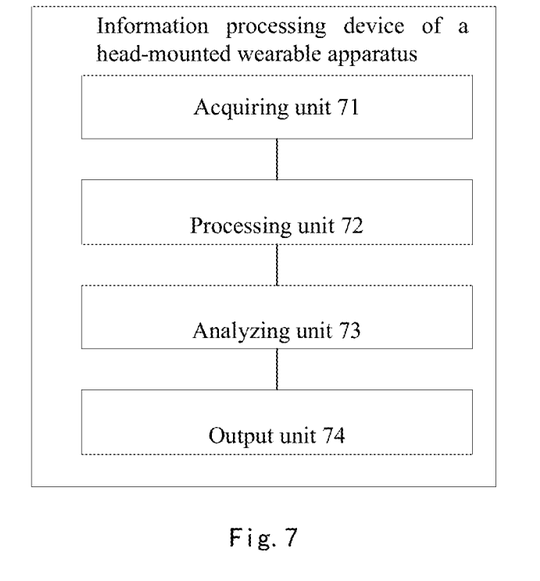
FIG. 7 is a structure diagram of an information processing device for a head-mounted wearable apparatus provided in an embodiment of present disclosure.

In the third aspect of the present embodiment of the disclosure, an information processing device for a head-mounted wearable apparatus is further provided. As shown in FIG. 7, the information processing device for a head-mounted wearable apparatus in the present embodiment includes an acquiring unit 71, a processing unit 72, an analyzing unit 73 and an output unit 74.

The acquiring unit 71 is operable to acquire image information of the conversation partner including facial images and body images of the conversation partner.

The processing unit 72 is operable to analyze the body images to achieve an analysis result of behavior and analyze the facial images to achieve analysis results of heart rate and pupil.

The analyzing unit 73 is operable to determine an output result of the conversation contents of the conversation partner in accordance with the analysis results of behavior, heart rate and pupil.

The output device 74 is operable to output the output result of the conversation contents to the user of the head-mounted wearable apparatus.

By way of example, the above-mentioned analyzing the body images to achieve an analysis result of behavior by the processing unit 72 will be described as follows.

The body image at the current point in time is compared with that at the first point in time.

If the body image at the current point in time is nearer to the user relative to that at the first point in time, it can be determined that the conversation partner is interested in the contents of the current conversation, resulting in an analysis result of behavior.

Wherein the first point in time is prior to the current point in time, and there is a preset interval between the two points.

Furthermore, the above mentioned analyzing the facial images to achieve analysis results of heart rate and pupil by the processing unit 72 will be described as follows.

The facial images are analyzed using contactless pulse oximetry to achieve an analysis result of heart rate.

The pupil area in the facial image at the current point in time and the pupil area in the facial image at the second point in time are obtained.

The pupil area at the current point in time is compared with that at the second point in time to achieve an analysis result of pupil.

Wherein the second point in time is prior to the current point in time, and there is a preset interval between the two points.

Furthermore, the above-mentioned analyzing unit 73 is operable to determine the output result of the conversation contents of the conversation partner to be positive when at least two of the analysis results of behavior, heart rate and pupil are positive.

Alternatively, in accordance with predetermined weighting factors of individual analysis results, an output result of the conversation contents of the conversation partner may be obtained by multiplying the analysis results with their own weighting factors and adding the products together.

Alternatively, an average value of all the analysis results is obtained and taken as the output result of the conversation contents of the conversation partner.

Moreover, in an optional implementation scene, the information processing device for a head-mounted wearable apparatus described above may include a receiving unit not shown in the figure, which will be described in the following.

The receiving unit is operable to receive a selecting instruction from the user before the body images and the facial images are analyzed by the processing unit 72.

Accordingly, the analysis results of behavior, heart rate and pupil from the processing unit 72 are respectively analysis results of behavior, heart rate and pupil indicating whether there is interest in the conversation contents.

In another optional implementation scene, the receiving unit is operable to receive an analysis instruction for credibility before the body images and the facial images are analyzed by the processing unit 72.

Accordingly, the analysis results of behavior, heart rate and pupil from the processing unit 72 are respectively analysis results of behavior, heart rate and pupil indicating the credibility rate of the conversation contents.

In an implementation process, the information processing device for a head-mounted wearable apparatus in the present embodiment may be implemented through software, which may be integrated into a physical structure of the head-mounted wearable apparatus to execute the process described above. Of course, in combination with the configurations of the head-mounted wearable apparatuses shown in FIG. 1 and FIG. 2, the information processing device in the present embodiment may also be implemented through physical circuit structures, which constitutes no limitation on the present embodiment and depends on specific circumstances.

In the present embodiment, by acquiring image information of the conversation partner, variation of heart rate, eyeball movement and change of pupil of the conversation partner and in turn the credibility of what the conversation partner has said and the degree of interest of the conversation partner in the conversation can be determined. The information processing device for a head-mounted wearable apparatus in the present embodiment of the disclosure is convenient to operate, of low costs and makes user experiences well improved.

Those skilled in the art can make various modifications and variations to the present disclosure without departing from the spirit and scope thereof. Thus, if these modifications and variations of the present disclosure are within the scope of the claims of the disclosure as well as their equivalents, the present disclosure is also intended to include these modifications and variations.

The present application claims priority of China patent application No. 201510609800.8 filed on Sep. 22, 2015, the disclosure of which is incorporated herein in its entirety by reference as a part of the present application.

The invention claimed is:

1. A wearable apparatus comprising:
  a camera configured to acquire facial images and body images of an interaction partner who is interacting with the user of the apparatus;
  a central processing unit connected with the camera and configured to analyze the facial images and the body images, and determine a truthfulness or an interest of the interaction partner with respect to the interacting with the user to achieve analysis results; and
  a display connected with the central processing unit and configured to output the analysis results;
  wherein the wearable apparatus further comprises a selecting button, which is connected with the central processing unit and configured to receive a selecting instruction from the user and send it to the central processing unit so that the central processing unit may obtain analysis results corresponding to the selecting instruction,
  wherein the analysis results comprise an analysis result of behavior obtained through analyzing the body images as well as an analysis result of heart rate and an analysis result of pupil obtained by analyzing the facial images.

2. The apparatus of claim 1, wherein the camera is a first camera to acquire facial images and body images of the interaction partner; or the camera comprises a second camera to acquire body images of the interaction partner and a receiver to receive facial images of the interaction partner.

3. The apparatus of claim 1, wherein the first camera and/or the second camera are/is binocular camera(s).

4. The apparatus of claim 1, wherein the display is a display screen for display of analysis results; or the display is a voice displayer for playback of analysis results in voice.

5. The apparatus of claim 1, wherein the wearable apparatus is intelligent glasses.

6. The apparatus of claim 5, wherein the intelligent glasses further comprise a glasses body and the camera, central processing unit and display are all disposed on the glasses body.

7. The apparatus of claim 1, wherein the selecting device comprises a first selecting unit to receive an analysis instruction for interest from the user and a second selecting unit to receive an analysis instruction for credibility from the user.

8. The apparatus of claim 1, wherein the wearable apparatus further comprises:

a wireless device connected with the central processing unit and operable to communicate with network equipments through a wireless network; and/or
a GPS device connected with the central processing unit and operable to locate the wearable apparatus; and/or
a camera connected with the central processing unit and operable to acquire facial images of the user of the wearable apparatus and a transmitter connected with the central processing unit and operable to transmit the images acquired by the camera.

9. The apparatus of claim 1, wherein the wearable apparatus comprises a head-mounted wearable apparatus.

10. The apparatus of claim 1, wherein the interaction partner comprises a conversation partner.

11. An information processing method for a wearable apparatus, comprising:

acquiring image information of the interaction partner who is interacting with the user of the wearable apparatus, the information comprising facial images and body images of the interaction partner;
analyzing the body images to achieve an analysis result of behavior and analyzing the facial images to achieve an analysis result of heart rate and an analysis result of pupil;
determining an output result of the conversation contents given by the interaction partner in accordance with the analysis result of behavior, analysis result of heart rate and analysis result of pupil, wherein the output result is about a truthfulness or an interest of the interaction partner with respect to the interacting with the user; and
outputting the output result of the conversation contents to the user of the wearable apparatus;
wherein before the body images are analyzed, the method further comprises:
receiving a selecting instruction from a selecting button of the wearable apparatus;
determining the analysis result of behavior, the analysis result of heart rate and the analysis result of pupil according to the selecting instruction,
wherein if the received selecting instruction is an analysis instruction for interest, the analysis results of behavior, heart rate and pupil are respectively analysis results of behavior, heart rate and pupil indicating whether there is interest in the interaction contents; and if the received selecting instruction is an analysis instruction for credibility, the analysis results of behavior, heart rate and pupil are respectively analysis results of behavior, heart rate and pupil indicating the credibility rate of the interaction contents.

12. The method of claim 11, wherein analyzing the body images to achieve an analysis result of behavior comprises:

comparing the body image at the current point in time with the body image at the first point in time; and
determining an analysis result of behavior indicating that the conversation partner is interested in the current interaction contents if the body image at the current point in time is nearer to the user relative to the body image at the first point in time;
wherein the first point in time is prior to the current point in time, and there is a preset interval between the two points.

13. The method of claim 11, wherein analyzing the facial images to achieve analysis results of heart rate and pupil comprises:

analyzing the facial images using contactless pulse oximetry to achieve the analysis result of heart rate;
obtaining the pupil area in the facial image at the current point in time and the pupil area in the facial image at the second point in time; and
comparing the pupil area at the current point in time with the pupil area at the second point in time to achieve the analysis result of pupil;
wherein the second point in time is prior to the current point in time, and there is a preset interval between the two points.

14. The method of claim 11, wherein determining an output result of the interaction contents given by the interaction partner in accordance with the analysis result of behavior, analysis result of heart rate and analysis result of pupil comprises:

determining the output result of the interaction contents of the interaction partner to be positive when at least two of the analysis result of behavior, analysis result of heart rate and analysis result of pupil are positive; or
in accordance with predetermined weighting factors of individual analysis results, obtaining the output result of the interaction contents of the interaction partner by multiplying the analysis results with their own weighting factors and adding the products together; or
obtaining the average value of all the analysis results and taking it as the output result of the interaction contents of the interaction partner.

15. The method of claim 11, wherein the wearable apparatus comprises a head-mounted wearable apparatus.

16. The method of claim 11, wherein the interaction partner comprises a conversation partner.

17. An information processing device for a wearable apparatus, the device comprising:

a camera configured to acquire image information of the interaction partner who is interacting with the user of the wearable apparatus, the information comprising facial images and body images of the interaction partner;
a central processing unit configured to:
analyze the body images to achieve an analysis result of behavior and analyze the facial images to achieve analysis results of heart rate and pupil; and
determine an output result of the interaction contents given by the interaction partner in accordance with the analysis result of behavior, analysis result of heart rate and analysis result of pupil, wherein the output result is about a truthfulness or an interest of the interaction partner with respect to the interacting with the user;

a display configured to output the output result of the interaction contents to the user of the wearable apparatus; and a receiver operable to receive a selecting instruction of the user from a selecting button of the wearable apparatus before the body images and the facial images are analyzed by the central processing unit;

wherein the central processing unit is further configured to determine the analysis result of behavior, analysis result of heart rate and analysis result of pupil according to the selecting instruction, wherein the processing unit is further configured to
- analyze the facial images using contactless pulse oximetry to achieve an analysis result of heart rate;
- obtain the pupil area in the facial image at the current point in time and the pupil area in the facial image at a second point in time; and
- compare the pupil area at the current point in time with the pupil area at the second point in time to achieve an analysis result of pupil;

wherein the second point in time is prior to the current point in time, and there is a preset interval between the two points.

* * * * *